United States Patent
Guyen

[11] 4,153,337
[45] May 8, 1979

[54] HIGH-POWER ZOOM PROJECTION OBJECTIVE

[75] Inventor: Xiem Guyen, Monnaz, Switzerland

[73] Assignee: Robert Bosch GmbH, Stuttgart, Fed. Rep. of Germany

[21] Appl. No.: 783,200

[22] Filed: Mar. 31, 1977

[30] Foreign Application Priority Data

Apr. 2, 1976 [DE] Fed. Rep. of Germany ....... 2614267

[51] Int. Cl.² ............................................. G02B 15/14
[52] U.S. Cl. .................................................. 350/184
[58] Field of Search .................................. 350/184, 186

[56] References Cited
U.S. PATENT DOCUMENTS

4,063,800  12/1977  Iizuka ..................................... 350/184

*Primary Examiner*—Paul A. Sacher
*Attorney, Agent, or Firm*—Michael J. Striker

[57] ABSTRACT

The zoom objective includes, proceeding in order in direction from the farther to the closer conjugate of the zoom objective, a first lens group, a second lens group, and a main objective. The first lens group is convergent and consists of a cemented doublet. The second lens group is divergent and consists of a cemented doublet. The second lens group is axially shiftable. The first and second lens groups together constitute a zoom-projection-objective variator having a negative refractive power. The main objective of the zoom objective is convergent and comprises a plurality of lens elements, the two of which closest to the second lens group together form a component lens system having a positive refractive power.

3 Claims, 4 Drawing Figures

HIGH-POWER ZOOM PROJECTION OBJECTIVE

BACKGROUND OF THE INVENTION

The invention relates to high-power zoom projection objectives. The invention is concerned with a high-power zoom projection objective which comprises, proceeding in order in direction from the farther to the closer conjugate of the zoom objective, a convergent first lens group, an axially shiftable divergent second lens group and a convergent main objective, with the first and second lens groups each consisting of a cemented doublet.

The invention relates to the problem of spherical aberration and astigmatism in a high-power zoom projection objective of the stated construction.

SUMMARY OF THE INVENTION

It is a general object of the invention to provide a high-power zoom projection objective of the stated construction whose spherical aberration and astigmatism vary within very narrow ranges despite a high light-gathering ability of the zoom objective, Also, it is an object of the invention to accomplish this in a manner utilizing a construction which is comparatively simple and economical to assemble.

These objects and others can be achieved, according to one concept of the invention, by designing the aforementioned first and second lens groups to constitute together a variator having a negative refractive power, and by designing the two components lenses of the main objective closest to the second lens group to form a component lens having a positive refractive power.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
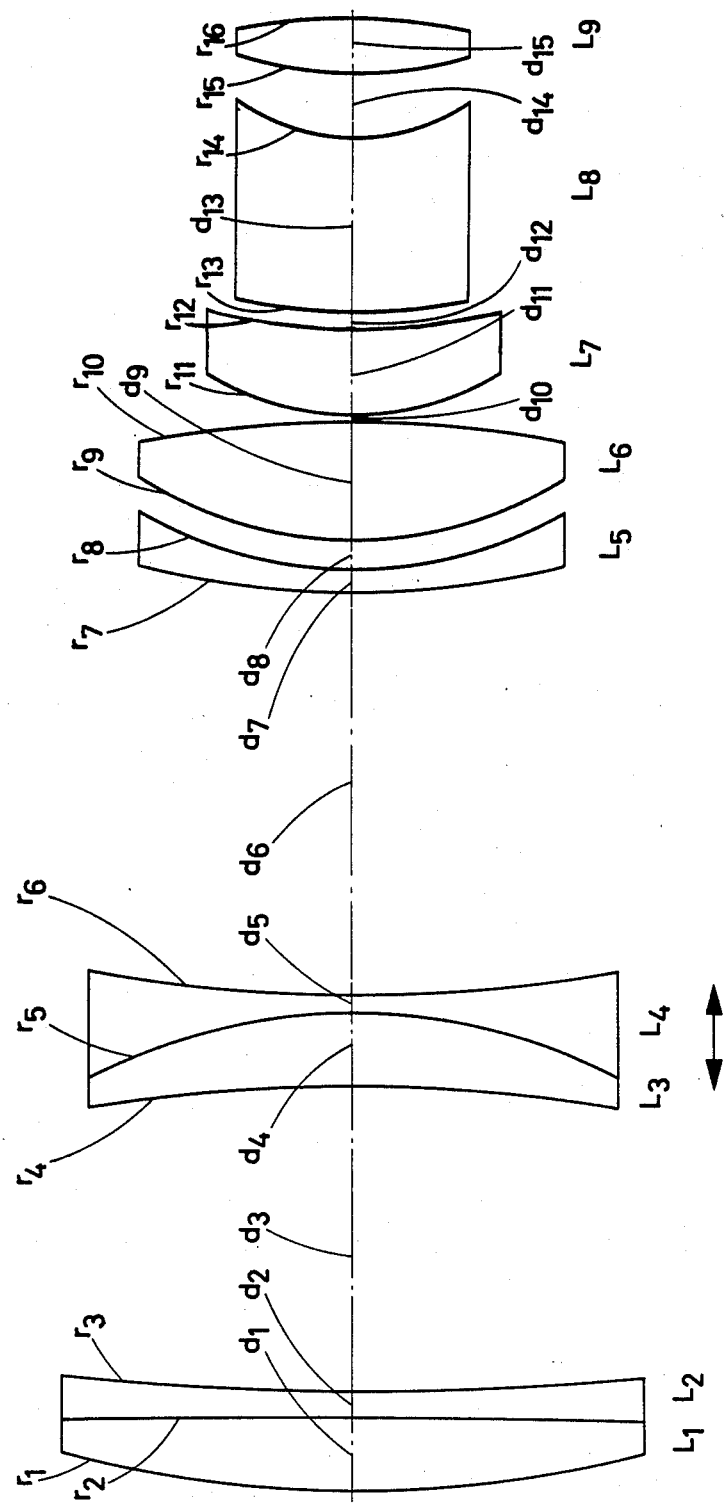
FIG. 1 depicts the construction of a high-power zoom projection objective designed in accordance with the inventive concepts.

FIG. 1 depicts the construction of a high-power (i.e., high-light-gathering-capacity wide-aperture) zoom projection lens constructed in accordance with the present invention.

The zoom objective is comprised of nine lenses $L_1$ to $L_9$, arranged in order proceeding from the object side (proceeding rightward or in the direction from farther to closer conjugate of the zoom objective).

A first lens group $L_1$, $L_2$ consists of a cemented doublet and is convergent. A second lens group $L_3$, $L_4$ likewise consists of a cemented doublet and is divergent. The main objective of the zoom objective consists of five lenses $L_5$ to $L_9$. The second lens group $L_3$, $L_4$ is axially shiftable (as indicated by the double-headed arrow). The first and second lens groups of the zoom objective together constitute the zoom-objective variator, and this variator has a negative refractive power. The two lenses $L_5$, $L_6$ of the main objective located closest to the second lens group $L_3$, $L_4$ together form a component lens system having a positive refractive power. The main objective $L_5$ to $L_9$ overall is convergent.

Reference characters $r_1$ to $r_{16}$ denote radii of curvature of the indicated refractive surfaces.

Reference characters $d_1$ to $d_{15}$ denote the the optical-axis thicknesses of the lenses and of the air spaces between adjoining lenses.

In the preferred embodiments of the invention, the following system conditions apply:

First lens group
 (1) $P_{1,2} > 0$
 (2) $\frac{0.2}{F_{max}} \leq P_{1,2} \leq \frac{0.4}{F_{max}}$ Second lens group
 (1) $P_{3,4} < 0$
 (2) $\frac{0.5}{F_{max}} \leq P_{3,4} \leq \frac{0.7}{F_{max}}$ Third lens group (main objective)
 (1) $P_{5,6,7,8,9} > 0$
 (2) $\frac{0.5}{F_{max}} \leq P_{5,6,7,8,9} \leq \frac{0.8}{F_{max}}$
 (3) $P_{5,6} > 0$
 (4) $0.5\, P_{5,6,7,8,9} \leq P_{5,6} \leq 0.7\, P_{5,6,7,8,9}$
 (5) The air lens between lenses $L_5$ and $L_6$ has a negative refractive power.
 (6) $0.8 \leq \frac{P_8}{P_9} \leq 1$
 (7) $\frac{0.01}{P_{5,6,7,8,9}} \leq d_8 \leq \frac{0.07}{P_{5,6,7,8,9}}$ where
 $F_{max}$ = The maximum focal length to which the zoom objective can be set.
 $P_{1,2 \ldots j}$ = The absolute value of the refractive power of the lens system formed by lenses $L_1$, $L_2 \ldots L_j$
 $P_1, P_2 \ldots P_j$ = The refractive powers of the individual lenses $L_1, L_2 \ldots L_j$
 $d_8$ = The thickness of the air lens between lenses $L_5$ and $L_6$.

Advantageously, the zoom-objective variator constituted by the first and second lens groups has a negative refractive power whose magnitude is in the range between 0.11 times and 0.29 times the reciprocal of the maximum zoom-objective focal length $F_{max}$.

Figure 2:
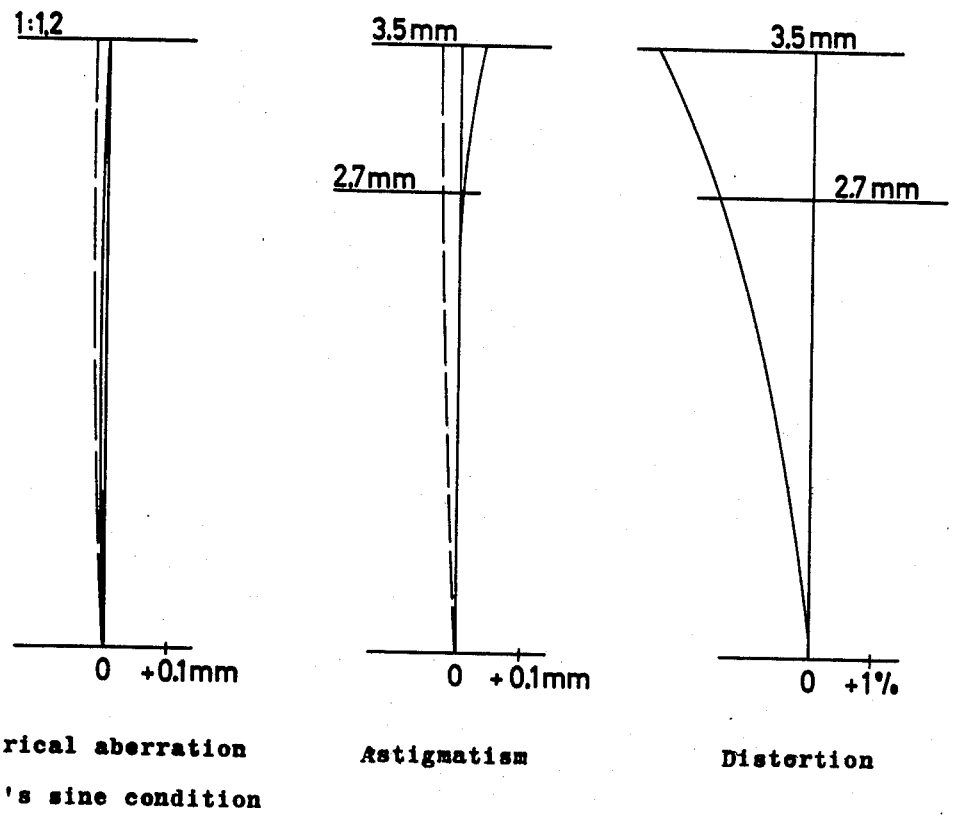
FIGS. 2 to 4 respectively depict the degree of correction achieved for the zoom projection objective at minimum focal length, intermediate focal length and maximum focal length.
Figure 3:
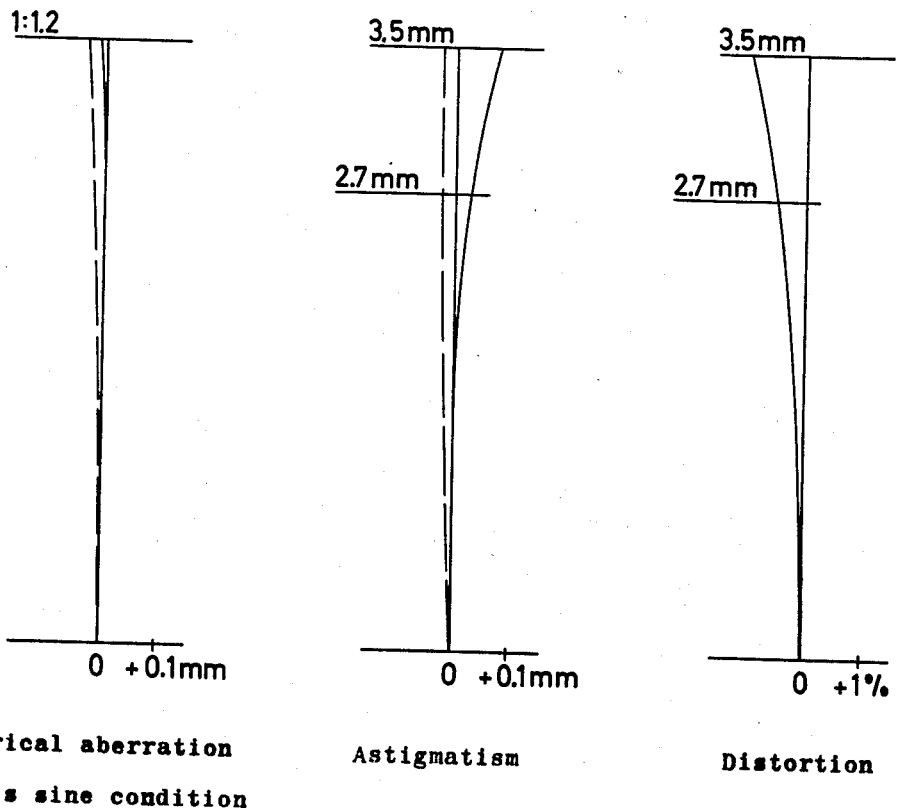
Figure 4:
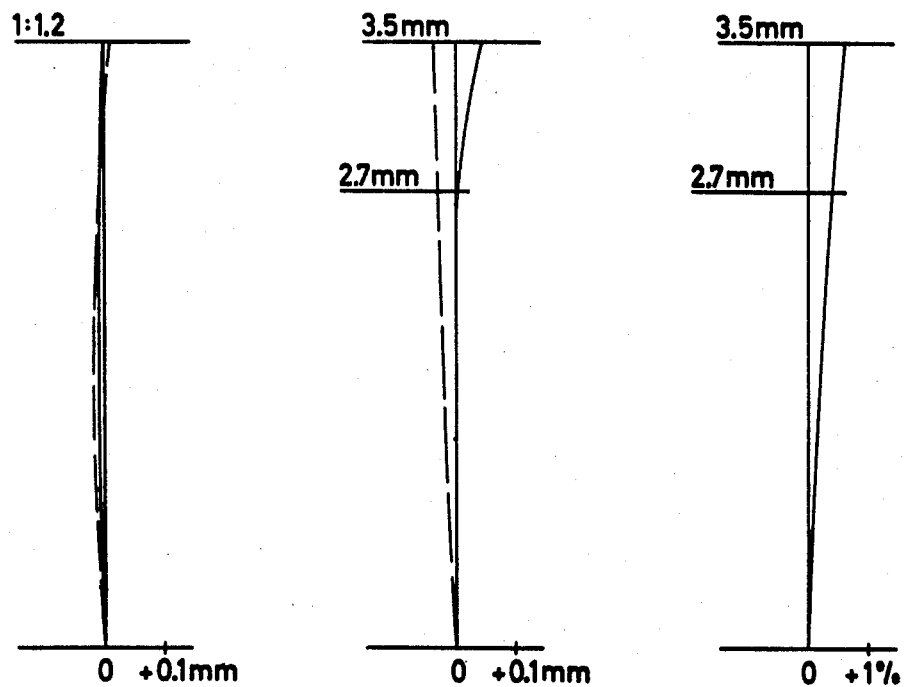

FIGS. 2 to 4 respectively depict the degree of correction achieved with the above-enumerated conditions are met in the construction of FIG. 1, for minimum focal length, intermediate focal length, and maximum focal length according to the embodiment of the invention described hereafter as EXAMPLE 2.

EXAMPLE 1

In this example, the focal length of the zoom objective was variable between 16 and 30 units. The aperture ratio of the objective was 1:1.2.

The curvature radii $r_1$ to $r_{16}$, the distances $d_1$ to $d_{15}$, the refractive indices $n_e$ for the nine lenses, and the Abbe constants $\nu_e$ for the nine lenses were as follows:

|   |   |   | $n_e$ | $\nu_e$ |
|---|---|---|---|---|
| $L_1$ | $r_1 = 45.67$ | $d_1 = 3.2$ | 1.62541 | 56.62 |
|  | $r_2 = -450.0$ |  |  |  |

-continued

| | | | $n_e$ | $v_e$ |
|---|---|---|---|---|
| $L_2$ | | $d_2 = 1.0$ | 1.7343 | 28.5 |
| | $r_3 = 146.0$ | | | |
| | | $d_3 =$ adjustable from 1.96 to 29.96 | | |
| | $r_4 = -51.41$ | | | |
| $L_3$ | | $d_4 = 2.5$ | 1.72311 | 29.30 |
| | $r_5 = =24.02$ | | | |
| $L_4$ | | $d_5 = 1.0$ | 1.62541 | 56.62 |
| | $r_6 = 58.8$ | | | |
| | | $d_6 =$ adjustable from 32.0 to 4.0 | | |
| | $r_7 = 34.11$ | | | |
| $L_5$ | | $d_7 = 1.0$ | 1.7919 | 25.87 |
| | $r_8 = 17.60$ | | | |
| | | $d_8 = 1.25$ | | |
| | $r_9 = 18.28$ | | | |
| $L_6$ | | $d_9 = 4.6$ | 1.72055 | 50.17 |
| | $r_{10} = -45.7$ | | | |
| | | $d_{10} = 0.1$ | | |
| | $r_{11} = 11.72$ | | | |
| $L_7$ | | $d_{11} = 3.5$ | 1.72055 | 50.17 |
| | $r_{12} = 35.84$ | | | |
| | | $d_{12} = 0.87$ | | |
| | $r_{13} = \infty$ | | | |
| $L_8$ | | $d_{13} = 7.0$ | 1.7919 | 25.87 |
| | $r_{14} = 7.36$ | | | |
| | | $d_{14} = 2.8$ | | |
| | $r_{15} = 15.485$ | | | |
| $L_9$ | | $d_{15} = 2.5$ | 1.74795 | 44.50 |
| | $r_{16} = -44.6$ | | | |

EXAMPLE 2

In this example the focal length of the zoom objective was variable between 16 and 30 units, and the aperture ratio of the objective was 1:1.2.

The curvature radii $r_1$ to $r_{16}$, the distances $d_1$ to $d_{15}$, the refractive indices $n_e$ for the nine lenses, and the Abbe constants $v_e$ for the nine lenses were as follows:

| | | | $n_e$ | $v_e$ |
|---|---|---|---|---|
| | $r_1 = 45.67$ | | | |
| $L_1$ | | $d_1 = 3.2$ | 1.62555 | 57.9 |
| | $r_2 = -450.0$ | | | |
| $L_2$ | | $d_2 = 1.0$ | 1.7348 | 28.6 |
| | $r_3 = 146.0$ | | | |
| | | $d_3 =$ adjustable from 1.96 to 29.96 | | |
| | $r_4 = -51.41$ | | | |
| $L_3$ | | $d_4 = 2.5$ | 1.7242 | 29.03 |
| | $r_5 = -24.02$ | | | |
| $L_4$ | | $d_5 = 1.0$ | 1.62510 | 56.9 |
| | $r_6 = 58.8$ | | | |
| | | $d_6 =$ adjustable from 32.0 to 4.0 | | |
| | $r_7 = 38.0$ | | | |
| $L_5$ | | $d_7 = 1.0$ | 1.76170 | 27.40 |
| | $r_8 = 17.24$ | | | |
| | | $d_8 = 1.35$ | | |
| | $r_9 = 18.10$ | | | |
| $L_6$ | | $d_9 = 4.75$ | 1.7478 | 44.50 |
| | $r_{10} = -50.09$ | | | |
| | | $d_{10} = 0.1$ | | |
| | $r_{11} = 11.68$ | | | |
| $L_7$ | | $d_{11} = 3.5$ | 1.69415 | 53.17 |
| | $r_{12} = 35.4$ | | | |
| | | $d_{12} = 0.87$ | | |
| | $r_{13} = 665.0$ | | | |
| $L_8$ | | $d_{13} = 7.0$ | 1.79185 | 25.90 |
| | $r_{14} = 7.49$ | | | |
| | | $d_{14} = 2.5$ | | |
| | $r_{15} = 14.06$ | | | |
| $L_9$ | | $d_{15} = 2.4$ | 1.7478 | 44.50 |
| | $r_{16} = -54.4$ | | | |

Despite the relatively large aperture ratio of 1:1.2. and the focal-length-variation range of 1.9 (i.e., $F_{max} = 1.9\ F_{min}$), the zoom objective, in both examples is characterized by high image quality throughout the focal-length-variation range. Moreover, this was achieved using comparatively few lenses, particularly for the main objective $L_5$ to $L_9$.

It will be understood that each of the elements described above, or two or more together, may also find a useful application in other types of constructions differing from the types described above.

While the invention has been illustrated and described as embodied in a high-power zoom projection objective, it is not intended to be limited to the details shown, since various modifications and structural changes may be made without departing in any way from the spirit of the present invention.

Without further analysis, the foregoing will so fully reveal the gist of the present invention that others can, by applyiing current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A high-power zoom projection objective comprising, in combination, a first lens group; a second lens group; and a main objective, said first lens group, said second lens group and said main objective being arranged in the stated order in the direction from the farther to the closer conjugate of the zoom projection objective, said first lens group being convergent and consisting of two cemented-together simple lenses, said second lens group being divergent and consisting of two cemented-together simple lenses, said second lens group being axially movable and constituting together with said first lens group a zoom-projection-objective variator having a negative refractive power, said main objective being convergent and comprising a plurality of lens elements the two of which closest to said second lens group together form a component lens system having a positive refractive power, the zoom projection objective comprising nine lenses $L_1$, $L_2$, $L_3$, $L_4$, $L_5$, $L_6$, $L_7$, $L_8$, $L_9$ arranged in the stated order in the direction from the farther to the closer conjugate of the zoom projection objective, said first lens group, said second lens group and said main objective being respectively constituted by lens elements $L_1$ and $L_2$, $L_3$ and $L_4$, and $L_5$ to $L_9$, the radii of curvature of the front, intermediate and back refracting surfaces of said first and second lens groups respectively being $r_1$, $r_2$, $r_3$ and $r_4$, $r_5$, $r_6$, the radii of curvature of the front refractive surfaces of said lens elements $L_5$, $L_6$, $L_7$, $L_8$, $L_9$ respectively being $r_7$, $r_9$, $r_{11}$, $r_{13}$, $r_{15}$, the radii of curvature of the back refractive surfaces of said lens elements $L_5$, $L_6$, $L_7$, $L_8$, $L_9$ respectively being $r_8$, $r_{10}$, $r_{12}$, $r_{14}$, $r_{16}$, the optical-axis thickness of said lens elements $L_1$ to $L_9$ respectively being $d_1$, $d_2$, $d_4$, $d_5$, $d_7$, $d_9$, $d_{11}$, $d_{13}$, $d_{15}$, the optical-axis distance between said first and second lens groups being $d_3$, the optical-axis distance between said second lens group and said main objective being $d_6$, the optical-axis distances between said lens elements $L_5$ and $L_6$, $L_6$ and $L_7$, $L_7$ and $L_8$, $L_8$ and $L_9$, respectively being $d_8$, $d_{10}$, $d_{12}$, $d_{14}$, the focal length F of the entire zoom projection objective being variable between 16 and 30 units, the aperture ratio of the zoom projection objective being 1:1.2, the radii $r_1$ to $r_{16}$, the distance $d_1$ to $d_{15}$, the refractive indices $n_e$ of said lens elements $L_1$ to $L_9$, and the Abbe constants $v_e$ of said lens elements $L_1$ to $L_9$ being as follows:

|  |  | $n_e$ | $v_e$ |
|---|---|---|---|
| $L_1$ | $r_1 = 45.67$ | | |
| | $d_1 = 3.2$ | 1.62541 | 56.62 |
| | $r_2 = -450.0$ | | |
| $L_2$ | $d_2 = 1.0$ | 1.7343 | 28.5 |
| | $r_3 = 146.0$ | | |
| | $d_3 =$ adjustable from 1.96 to 29.96 | | |
| | $r_4 = -51.41$ | | |
| $L_3$ | $d_4 = 2.5$ | 1.72311 | 29.30 |
| | $r_5 = -24.02$ | | |
| $L_4$ | $d_5 = 1.0$ | 1.62541 | 56.62 |
| | $r_6 = 58.8$ | | |
| | $d_6 =$ adjustable from 32.0 to 4.0 | | |
| | $r_7 = 34.11$ | | |
| $L_5$ | $d_7 = 1.0$ | 1.7919 | 25.87 |
| | $r_8 = 17.60$ | | |
| | $d_8 = 1.25$ | | |
| | $r_9 = 18.28$ | | |
| $L_6$ | $d_9 = 4.6$ | 1.72055 | 50.17 |
| | $r_{10} = -45.7$ | | |
| | $d_{10} = 0.1$ | | |
| | $r_{11} = 11.72$ | | |
| $L_7$ | $d_{11} = 3.5$ | 1.72055 | 50.17 |
| | $r_{12} = 35.84$ | | |
| | $d_{12} = 0.87$ | | |
| | $r_{13} = \infty$ | | |
| $L_8$ | $d_{13} = 7.0$ | 1.7919 | 25.87 |
| | $r_{14} = 7.36$ | | |
| | $d_{14} = 2.8$ | | |
| | $r_{15} = 15.485$ | | |
| $L_9$ | $d_{15} = 2.5$ | 1.74795 | 44.50 |
| | $r_{16} = 44.6$ | | |

2. A high-power zoom projection objective comprising, in combination, a first lens group; a second lens group; and a main objective, said first lens group, said second lens group and said main objective being arranged in the stated order in the direction from the farther to the closer conjugate of the zoom projection objective, said first lens group being convergent and consisting of two cemented-together simple lenses, said second lens group being divergent and consisting of two cemented-together simple lenses, said second lens group being axially movable and constituting together with said first lens group a zoom-projection-objective variator having a negative refractive power, said main objective being convergent and comprising a plurality of lens elements the two of which closest to said second lens group together form a component lens system having a positive refractive power, the zoom projection objective comprising nine lenses $L_1$, $L_2$, $L_3$, $L_4$, $L_5$, $L_6$, $L_7$, $L_8$, $L_9$ arranged in the stated order in the direction from the farther to the closer conjugate of the zoom projection objective, said first lens group, said second lens group and said main objective being respectively constituted by lens elements $L_1$ and $L_2$, $L_3$ and $L_4$, and $L_5$ to $L_9$, the radii of curvature of the front, intermediate and back refracting surfaces of said first and second lens groups respectively being $r_1$, $r_2$, $r_3$ and $r_4$, $r_5$, $r_6$, the radii of curvature of the front refractive surfaces of said lens elements $L_5$, $L_6$, $L_7$, $L_8$, $L_9$ respectively being $r_7$, $r_9$, $r_{11}$, $r_{13}$, $r_{15}$, the radii of curvature of the back refractive surfaces of said lens elements $L_5$, $L_6$, $L_7$, $L_8$, $L_9$ respectively being $r_8$, $r_{10}$, $r_{12}$, $r_{14}$, $r_{16}$, the optical-axis thickness of said lens elements $L_1$ to $L_9$ respectively being $d_1$, $d_2$, $d_4$, $d_5$, $d_7$, $d_9$, $d_{11}$, $d_{13}$, $d_{15}$, the optical-axis distance between said first and second lens groups being $d_3$, the optical-axis distance between said second lens group and said main objective being $d_6$, the optical-axis distance between said lens elements $L_5$ and $L_6$, $L_6$ and $L_7$, $L_7$ and $L_8$, $L_8$ and $L_9$, respectively being $d_8$, $d_{10}$, $d_{12}$, $d_{14}$, the focal length F of the entire zoom projection objective being variable between 16 and 30 units, the aperture ratio of the zoom projection objective being 1:1.2, the radii $r_1$ and $r_{16}$, the distances $d_1$ and $d_{15}$, the refractive indices $n_e$ of said lens elements $L_1$ to $L_9$, and the Abbe constants $v_e$ of said lens elements $L_1$ to $L_9$ being as follows:

|  |  | $n_3$ | $v_e$ |
|---|---|---|---|
| $L_1$ | $r_1 = 45.67$ | | |
| | $d_1 = 3.2$ | 1.62555 | 57.9 |
| | $r_2 = -450.0$ | | |
| $L_2$ | $d_2 = 1.0$ | 1.7348 | 28.6 |
| | $r_3 = 146.0$ | | |
| | $d_3 =$ adjustable from 1.96 to 29.96 | | |
| | $r_4 = -51.41$ | | |
| $L_3$ | $d_4 = 2.5$ | 1.7242 | 29.03 |
| | $r_5 = -24.02$ | | |
| $L_4$ | $d_5 = 1.0$ | 1.62510 | 56.9 |
| | $r_6 = 58.8$ | | |
| | $d_6 =$ adjustable from 32.0 to 4.0 | | |
| | $r_7 = 38.0$ | | |
| $L_5$ | $d_7 = 1.0$ | 1.76170 | 27.40 |
| | $r_8 = 17.24$ | | |
| | $d_8 = 1.35$ | | |
| | $r_9 = 18.10$ | | |
| $L_6$ | $d_9 = 4.75$ | 1.7478 | 44.50 |
| | $r_{10} = -50.09$ | | |
| | $d_{10} = 0.1$  $r_{11} = 11.68$ | | |
| $L_7$ | $d_{11} = 3.5$ | 1.69415 | 53.17 |
| | $r_{12} = 35.4$ | | |
| | $d_{12} = 0.87$ | | |
| | $r_{13} = 665.0$ | | |
| $L_8$ | $d_{13} = 7.0$ | 1.79185 | 25.90 |
| | $r_{14} = 7.49$ | | |
| | $d_{14} = 2.5$ | | |
| | $r_{15} = 14.06$ | | |
| $L_9$ | $d_{15} = 2.4$ | 1.7478 | 44.50 |
| | $r_{16} = 54.4$ | | |

3. A high-power zoom projection objective comprising, in combination, a first lens group; a second lens group; and a main objective, said first lens group, said second lens group and said main objective being arranged in the stated order in the direction from the farther to the closer conjugate of the zoom projection objective,
  (a) said first lens group being a convergent doublet and consisting of a first biconvex positive lens and of a first biconcave negative lens,
  (b) said second lens group being a divergent doublet movable along the optical axis of the projection objective relative to the other groups for varying magnification and forming together with said first lens group of a variator having a negative refractive power and consisting of a second positive meniscus, the concave surface of which facing the farther conjugate of the projection objective, and of a second biconcave negative lens; and
  (c) said main objective being convergent and comprising a plurality of lens elements the two of which closest to said second lens group together form a non cemented component lens system having a positive refractive power and consisting of a third forward negative meniscus the convex surface of which facing the farther conjugate of the projection objective and a third biconvex positive lens.

* * * * *